(12) United States Patent
Prakash et al.

(10) Patent No.: US 8,403,091 B2
(45) Date of Patent: Mar. 26, 2013

(54) PNEUMATIC-IC ENGINE BASED POWER MANAGEMENT SYSTEM FOR AUTOMOBILES AND THE LIKE

(76) Inventors: Amit Prakash, Hudson, OH (US); George Richard Sharp, Marco Island, FL (US)

( * ) Notice: Subject to any disclaimer, the term of this patent is extended or adjusted under 35 U.S.C. 154(b) by 389 days.

(21) Appl. No.: 12/763,511

(22) Filed: Apr. 20, 2010

(65) Prior Publication Data

US 2010/0270097 A1    Oct. 28, 2010

(30) Foreign Application Priority Data

Apr. 22, 2009   (IN) .............................. 649/KOL/2009

(51) Int. Cl.
*B60K 6/00* (2007.10)
(52) U.S. Cl. ........................................ 180/165; 180/302
(58) Field of Classification Search .................. 180/165, 180/197, 65.2, 69.6; 123/90.11, 68, 299, 123/480; 152/415, 416
See application file for complete search history.

(56) References Cited

U.S. PATENT DOCUMENTS

| | | | | |
|---|---|---|---|---|
| 4,123,910 A * | 11/1978 | Ellison, Sr. | ................... | 180/69.6 |
| 4,763,709 A * | 8/1988 | Scholer | .......................... | 152/416 |
| 4,798,053 A * | 1/1989 | Chang | ............................ | 180/165 |
| 5,141,589 A * | 8/1992 | Mittal | ............................ | 152/415 |
| 5,549,174 A * | 8/1996 | Reis | ................................. | 180/165 |
| 6,499,552 B2 * | 12/2002 | Bell | ................................. | 180/197 |
| 7,177,751 B2 * | 2/2007 | Froloff et al. | .................. | 123/480 |
| 7,216,735 B2 * | 5/2007 | Gonzalez Mena | ............ | 180/165 |
| 7,353,786 B2 * | 4/2008 | Scuderi et al. | ................... | 123/68 |
| 7,370,630 B2 * | 5/2008 | Turner et al. | .................. | 123/299 |
| 2005/0211480 A1 * | 9/2005 | Kejha | ............................ | 180/65.2 |
| 2007/0113803 A1 * | 5/2007 | Froloff et al. | ............... | 123/90.11 |
| 2010/0212307 A1 * | 8/2010 | Gerisch | ........................... | 60/412 |

* cited by examiner

*Primary Examiner* — Hau Phan
(74) *Attorney, Agent, or Firm* — David L King (57) ABSTRACT

A pneumatic-internal combustion (IC) engine based power management system with improved energy efficiency for automobile application. More particularly, the pneumatic IC engine based power management system comprises a compressor, a pressure vessel, a pneumatic motor and related control mechanisms to provide energy on demand and reduce environmental pollution. The compressor is driven by the IC engine during low power demand by the vehicle. The lightweight pressure vessel wrapped with high strength metal wire and/or fibers provide impact resistance adequate to store compressed air at rated pressure. For low/no load condition of engine or compressor, the IC engine will shut off rather than idling to save fuel. The stored compressed air drives the air motor that powers the vehicle's initial motion and then starts the IC engine to provide continuous power. A controller monitors the power demand and actuates different system components accordingly through sensors. The system also supports accessories such as air conditioning, heater etc. and a wheel-rim system for inflation maintenance and easy change over of tires.

20 Claims, 3 Drawing Sheets

PNEUMATIC-IC ENGINE BASED POWER MANAGEMENT SYSTEM FOR AUTOMOBILES AND THE LIKE

RELATED APPLICATIONS

This patent application claims priority to application number 649/KOL/2009 entitled "A Pneumatic—IC Engine Based Power Management System For Automobiles And The Like" filed in India on Apr. 22, 2009.

TECHNICAL FIELD

The present invention relates to pneumatic-internal combustion (IC) engine based power management system for improved energy efficiency for automobile and like applications. More particularly, the invention relates to a hybrid powered vehicles having pneumatic power management system to improve the fuel efficiency of an IC engine adapted to provide energy on demand and reduce environmental pollution. The system of the present invention involves a controller such that compressed air from an on board pressure vessel powers a pneumatic motor to provide energy during peak and other demand periods therefore reducing high fuel consumption operation of the primary Internal Combustion (IC) engine. During certain low demand period the IC engine may shut off or act as a compressor. Also, the on board compressed air supply is further adapted to supports an active inflation system preferably involving a selective rim having reduced flange height for easy replacement of tires. Reinforcement of the pressure vessel with 2000 to 6000 MPa ductile steel wire is also provided to reduce the weight of the tank. The pneumatic-IC engine power management system is thus adapted to economize fuel consumption, reduce environmental pollution and also support auxiliary functions in light motor vehicles in simple, safe and efficient manner.

BACKGROUND OF THE INVENTION

It is well known in the art of combustion systems for the IC engines, conventional gasoline powered vehicles typically utilize only 20 to 30% of energy available in the fuel thus wasting majority in the form of heat. Improving such low energy conversion of chemical energy of fuel to driving force for automobiles has been attempted in many ways to not only improve the fuel economy but also proportionately reduce emission of environmentally harmful gases. Multi motor hybrid power plants such as combination of gasoline and electric motors, have helped optimize the power system and are in commercial use.

It is experienced in the related art that most commercial hybrid vehicles use combination of electric and gasoline systems. This requires an electricity generator, a battery to store energy and an electric motor. This system improves the overall fuel efficiency of the vehicle however there are three disadvantages or limitations such as: higher weight, high cost of the system and limited life of the battery. More over, the Electric generators and motors used in such hybrid systems essentially include components made of copper and steel and therefore are inherently heavy and expensive. Batteries also are relatively heavy for the amount of energy they store and have limited life. These factors have been responsible for a somewhat poor acceptance of gasoline-electric hybrid vehicles by consumers who were in need of cost, effective light, versatile and sustainable power drive systems for vehicles along with meeting the basic fuel economy and pollution control objective.

As commonly known in principles of physics, compressed air has stored internal energy proportional to its pressure and volume. Pneumatic tools and motors for various applications use energy from the compressed air/gas to deliver power. Attempts have also been made to provide power to vehicles but without significant efficiency and economy.

Scuderi group holds several patents for example U.S. Pat. No. 7,353,786 on split cycle air hybrid engine. On board storage of compressed air requires impact resistant lightweight pressure vessels. It is felt that on the availability of a cost effective and lightweight pressure vessel, these air powered vehicles can create significant customer acceptance with efficiency and reliability. Efficient compressors have also been a subject of development for application in developing such hybrid systems for example U.S. Pat. No. 7,104,765.

There has therefore been an unfulfilled need to develop better hybrid systems to augment power requirements for conventional IC engine powered vehicles light automobiles/vehicles for personal or commercial use that would overcome the limitations of the prior art similar other devices.

OBJECTS OF THE INVENTION

The basic object of the present invention is thus directed to developing a hybrid power drive system comprising pneumatic-IC engine management system based light automobiles using conventional Internal combustion engines to improve fuel economy, enhanced energy efficiency and reduced air pollution by the exhaust gases.

Another object of the present invention is directed to a pneumatic-IC engine based hybrid power drive system involving on board facilities for compressed air such that it would be capable of optimized fuel consumption and saving fuel as well as environmental pollution by selectively providing pneumatic power drive for the vehicle either independently or in combination with the IC engine depending on peak or low/no load conditions or to provide power to compress air from IC engine under no load condition, to restore/compensate the stored energy of the compressed air already consumed and dropped below the threshold limit, thus ensuring safe and economic operation of such hybrid system on sustainable basis.

A further object of the present invention is directed to developing said pneumatic-IC engine powered light vehicles/automobiles wherein a pneumatic power management system could be provided to enhance energy efficiency of IC engine and mechanisms to provide energy on demand and save fuel in a simple, safe and reliable manner.

A still further object of the present invention is directed to developing said pneumatic-IC engine powered light vehicles involving pneumatic system having a lightweight rupture resistant pressure vessel having high strength capable of storing the compressed air on board a vehicle to drive air motor for assisting the IC engine as needed to favor desired weight/power ratio and the wrapping configuration favour reduced cost and improving the damage tolerance of the tank.

A still further object of the present invention is directed to developing a pneumatic-IC engine power management system for automobiles and the like wherein the IC engine could be shut off on no load condition and fuel injection cut off during idle run e.g. on slope or during deceleration, and the kinetic energy of the vehicle be directed to power the air compressor.

A still further object of the present invention is directed to developing a pneumatic-IC engine power management system for light vehicles/automobiles wherein in multi cylinder IC engines, only limited number of cylinders of the IC engine may be switched to a pneumatic compressor mode while other cylinders provide compression energy by running on the fuel.

A still further object of the present invention is directed to developing said pneumatic-IC engine power management system for light vehicles/automobiles wherein said hybrid system favor reducing fuel consumption by eliminating the wasteful idling of IC engine.

A still further object of the present invention is directed to developing said pneumatic-IC engine power management system for light vehicles/automobiles wherein the system could optionally support accessories on the vehicle such as air conditioning, heater etc. and advantageously also support a new design wheel-rim system for inflation maintenance and easy change over of tyres.

SUMMARY OF THE INVENTION

Thus according to the basic aspect of the invention there is provided a pneumatic Internal Combustion (IC) engine based power management system for automobiles and the like comprising: an internal combustion engine operatively connected to an air motor; a pneumatic power center supported by a pneumatic compressor adapted to be powered by said internal combustion engine or kinetic energy of the automobile and adapted to store air in a pressure vessel; controller means adapted to monitor the power demands for the operation of the automobile, the IC engines RPM and torque and air motors RPM and torque and send signals to the IC engine and its fuel injector systems and to the air motor control valves to respond based thereon.

Another aspect of the present invention is directed to a pneumatic-IC engine based power management system for automobiles and the like wherein the controller is adapted such that when the power demand for the operation of the vehicle is low, the controller activates the compressor powered by the IC engine to fill the tank with compressed air/gas and when the demand of power for the operation of the vehicle is high, the controller cuts-off the compressor and other accessories; gear means adapted to transfer power to the wheels of the vehicle.

A further aspect of the present invention is thus directed to a pneumatic-IC engine based power management system for automobiles and the like wherein said controller means comprises a part of the fuel injection controller system of the automobile.

A still further aspect of the present invention is directed to a pneumatic-IC engine based power management system for automobiles and the like wherein said air motor is of sufficient horse power to roll the vehicle independently and assist start-up of the IC engine.

A still further aspect of the present invention is directed to a pneumatic-IC engine based power management system for automobiles and the like wherein said air motor exceeds 1 HP and preferably be over 20% of the rated HP of the IC engine.

A still further aspect of the present invention is directed to a pneumatic-IC engine based power management system for automobiles and the like wherein when the demand of power for the running of the vehicle is low and the pressure in the pressure vessel is below the standard rated level, the pneumatic compressor is adapted to engage to the IC engine through a clutch thereby storing compressed air in the pressure vessel.

According to yet another aspect of the present invention is directed to a pneumatic-IC engine based power management system for automobiles and the like wherein the compressor is adapted to be activated during braking or deceleration without bringing IC engine in the circuit.

A still further advantageous aspect of the present invention is directed to a pneumatic-IC engine based power management system for automobiles and the like wherein if the pressure vessel has above 50% or more of the rated pressure of the air motor, during no power demand periods, the IC engine is adapted to be completely shut off, or idle at a very low 0-70% of the normal idle RPM.

According to yet another aspect of the present invention is directed to a pneumatic-IC engine based power management system for automobiles and the like wherein said IC engine is adapted to act as a compressor itself, preferably wherein the cylinder block of the IC engine, in addition to standard inlet and exhaust valves, is provided with an additional opening for a one way valve whereby following shut off of the fuel supply, the valve may open to divert compressed air during the compression cycle to the pressure vessel.

A further aspect of the present invention is directed to said pneumatic-IC engine based power management system for automobiles and the like comprising multi cylinder IC engines wherein only limited number of cylinders of the IC engine are adapted to be switched to a pneumatic compressor mode while other cylinders provide compression energy by running on the fuel.

A still further aspect of the present invention is directed to a pneumatic-IC engine based power management system for automobiles and the like wherein when the vehicle is operating under pneumatic power only, the IC engine is mechanically disengaged from the power train or alternatively its compression is reduced or vented out following cut off of the fuel supply to reduce the compression load on the air motor, said one way valve being adapted to release the compression to the atmosphere.

A still further aspect of the present invention is directed to a pneumatic-IC engine based power management system for automobiles and the like comprising a controller clutch means comprising a directional clutch bearing is provided to engage the air motor wherein the air motor is attached to the IC engine or to the main power train whereby it favours the engagement of the air motor to IC engine and/or to drive gear box only when the RPM of the air motor exceeds to that of the driven shaft thus providing a simple connection to deliver power.

According to yet another aspect of the present invention is directed to a pneumatic-IC engine based power management system for automobiles and the like wherein on demand of power when the IC engine is off or running below the required power level, the air motor will first be activated to start the IC engine and/or to provide power to the vehicle to thereby reduce fuel consumption during initial run/acceleration period by making advantageous use of higher torque of pneumatic motor at lower RPM.

An yet further aspect of the present invention is directed to a pneumatic-IC engine based power management system for automobiles and the like wherein the controller is adapted to utilize signals from various sensors to execute various control functions such as the flow control of air/fuel and selective operation of compressor, air motor and IC engine in said power management system to achieve desired fuel economy and higher energy efficiency.

A still further aspect of the present invention is directed to a pneumatic-IC engine based power management system for automobiles and the like wherein the stored compressed air is adapted to power accessories of the vehicle, Air conditioner, air blower and other functions powered by air, the fuel injectors of the IC engine are assisted by the compressed air without any separate compressor.

A still further aspect of the present invention is directed to a pneumatic-IC engine based power management system for automobiles and the like wherein the compressed air from the pressure tank is operatively connected to an active inflation system for the tires for proper maintenance of air pressure.

A still further aspect of the present invention is directed to a pneumatic-IC engine based power management system for automobiles and the like wherein to facilitate easy change over of tires and where the changed tire could be inflated from the air from the on-board pressure vessel, the wheel rim flange height is selectively not more than 14 mm with at least one flange between 6 mm to 14 mm, preferably 12 mm to thereby facilitate easy mounting and dismounting of tires from the wheel rim.

A still further aspect of the present invention is directed to a pneumatic-IC engine based power management system for automobiles and the like comprising a light weight tank for the use of pneumatic power on board a vehicle preferably having a metal or polymer core which is wound by carbon fibers or fiber glass coated with a resin matrix and preferably metal wires or only of metal wires in a polymer matrix to improve the impact resistance of the tank.

A still further aspect of the present invention is directed to a pneumatic-IC engine based power management system for automobiles and the like wherein said metal wires comprise steel wires in the strength range 2000 to 6000 MPa having a reduction in area (RA) ductility of over 30% is well suited for this application.

The present invention and its objects and advantages are described in greater detail with reference to the following accompanying non limiting illustrative figures and embodiments.

DETAILED DESCRIPTION OF THE INVENTION

The present invention as discussed above is thus directed to a hybrid power drive for automobiles involving pneumatic power management system to improve the fuel efficiency of an internal combustion (IC) engine powered vehicles comprising a compressor, a pressure vessel, a pneumatic motor and related control mechanisms to provide energy on demand. The dual powered system basically includes a central pneumatic power management system involving a compressor, a pressure vessel, a pneumatic motor of vane or piston type for providing assisting power to said IC engine and a controller for controlled action of the components maintaining preferred relation with one another within said system, depending on the load conditions/demand. The air motor provided comprises sufficient horse power to roll the vehicle independently and assist startup of the IC engine.

In accordance with an aspect the system of the present invention the air motor rating is minimum 1 Horse Power (HP) and preferably over 20% of the rated HP of the IC engine for desired optimized performance of the pneumatic assisted hybrid drive system and attaining desired fuel economy.

The system of the present invention is therefore directed to provide pneumatically assisted power drive to assist the IC engine driven automobiles or vehicles having 2 or more wheels to achieve fuel saving and reduce pollution level. The vehicles include 2 wheeler motor cycles/scooters, 3 wheel automobiles and 4 wheel cars. The system of the invention favours a pneumatic power management system to improve the fuel efficiency of internal combustion (IC) engine (1) powered vehicles. The invention additionally proposes a method to convert the function of one or more cylinders of the IC engine to an air compressor. The system is adapted to optionally support accessories on the vehicle such as air conditioning, heater etc. and support a new design wheel-rim system for inflation maintenance and easy change over of tyres.

The essential requirements of a lightweight pressure vessel for storing compressed air with requisite rupture strength is duly met in accordance with a preferred aspect of the invention by wrapping the vessel with metal wires or a combination of metal wires and ceramic fibers to improve the impact resistance of the tank. Metal wires, such as steel wires in the strength range 2000 to 6000 MPa having a reduction in area (RA) ductility of over 30% is selectively used for this application. This wrapping configuration favour reduced cost and improving the damage tolerance of the tank.

The compressor of the pneumatic system can be activated by either the IC engine or by the kinetic energy of the vehicle. When the demand of power for the running of the vehicle is low, e.g. during deceleration, idle or downhill and the pressure in the pressure vessel is below the standard rated level, the pneumatic compressor will engage to the IC engine through a clutch thus delivering compressed air in the pressure vessel. The compressor may be activated during braking or deceleration without bringing IC engine in the circuit.

If the storage pressure of compressed air in vessel is 50% or more of the rated pressure of the air motor, during no power demand periods, the IC engine is completely shut off, or idle at a very low 0-70% of the normal idle RPM. The normal idle RPM is the one recommended for the IC engine for smooth running and ramp up.

In accordance with another aspect of the invention, the IC engine can itself act as a compressor. The cylinder block of the IC engine, in addition to standard inlet and exhaust valves, is provided with an additional opening for a one way valve. This valve has also been referred to as bypass valve. Following shut off of the fuel supply, this valve can open to divert compressed air during the compression cycle to the pressure vessel. It is also proposed that in multi cylinder IC engines, only limited number of cylinders of the IC engine may be switched to a pneumatic compressor mode while other cylinders provide compression energy by running on the fuel.

Further, the system favors the occasional vehicle operation by pneumatic power only when the IC engine can be mechanically disengaged from the power train or alternatively its compression can be reduced or vented out following cut off of the fuel supply to reduce the compression load on the air motor. The bypass valve mentioned earlier can be used to release the compression to the atmosphere.

In accordance with yet further aspect of the invention, advantageously a directional clutch bearing is provided to engage the air motor for the simplification of the system. The air motor can be selectively engaged with either the IC engine or to the main power train through a controller clutch, such as a directional clutch bearing. This allows the engagement of the air motor to IC Engine and/or to drive gearbox only when the RPM of the air motor exceeds to that of the driven shaft thus providing a simple connection to deliver power.

On demand of power, when the IC engine is off or running below the required power level, the air motor will first be activated to start the IC engine and/or to provide additional drive power to the vehicle. The initial acceleration not being fuel efficient operation, assistance from air motor will reduce fuel consumption during the acceleration period. Additionally, pneumatic motors have higher torque at lower RPM thus helping the initial roll of the vehicle with fuel economy.

A controller is required to monitor the state of energy demand by the vehicle and accordingly activate the compressor, the pneumatic motor, the IC engine and valves controlling flow of fuel and air. During no demand period the IC engine can completely be turned off. Subsequently to initiate the motion, the pneumatic motor is activated to provide sufficient power to start a roll in the vehicle while starting the IC engine if so needed. The controller will utilize signals from various sensors to execute such operations in a well coordinated manner to achieve efficiency and economy in operation.

The above aspects of the pneumatically assisted hybrid drive system for automobile engines according to the invention and its manner of operation and implementation is described in further details with reference to the following non limiting illustrative figures: Reference is first invited to the accompanying FIG. 1 that schematically illustrates the pneumatic power management system to improve the fuel efficiency of an internal combustion (IC) engine (1) powered vehicles according to the present invention. is clearly apparent from the accompanying FIG. 1, that the power management system primarily comprises of a compressor (3), a pressure vessel (4), a pneumatic motor (2) and a controller (not shown) to activate these components. The compressor is connected to the IC engine (1) through a clutch selected from any one of an electric, a pneumatic or a mechanical clutch (12), when the compressor is powered by the IC engine to activate and pump air to the pressure vessel through airlines (31). Reciprocating, rotary and other types of compressors of standard configuration available in market are selected of appropriate rating and used for this application. It is known that the compressed air has energy proportional to its pressure and volume. It is well known in the art that there is a loss of energy in the compression process and the loss is a function of the pressure.

Figure 1:
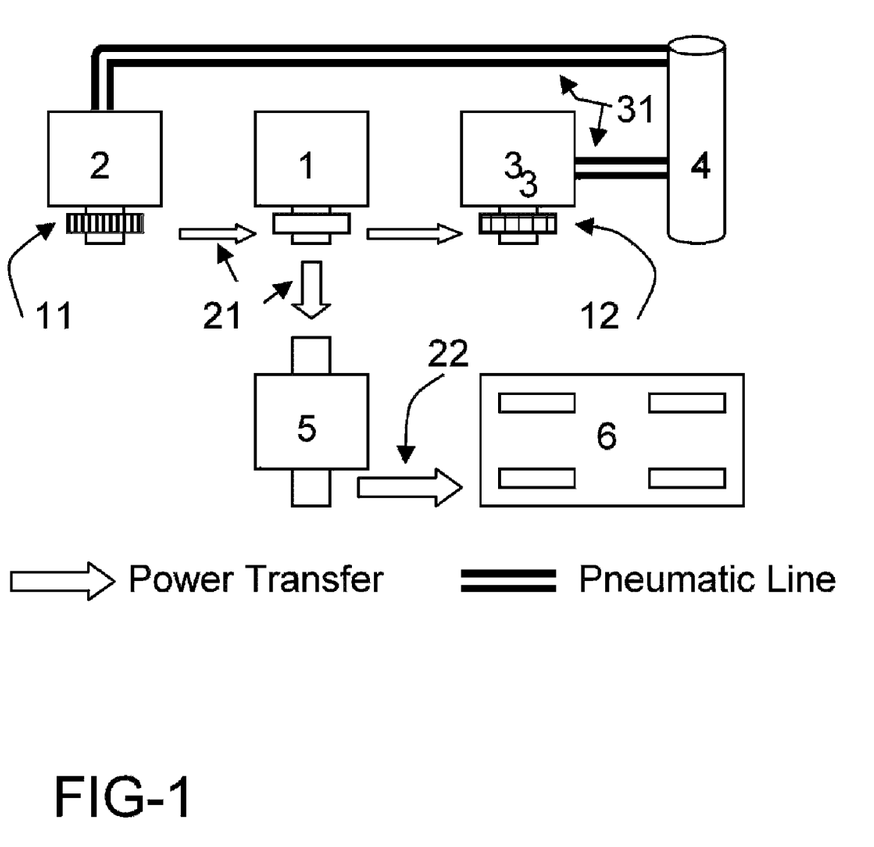
FIG. 1: is the schematic illustration of the hybrid system comprising the pneumatic assisted Internal Combustion engine driven light automobile vehicle according to the present invention.

In a preferred embodiment of the invention, a prototype system is developed, wherein a simple piston type compressor developing 10 bar (150 PSI) pressure has been used. The compressor was connected to the IC engine through an electric clutch. compressed air flows through lines 31 and connected to stored air in a lightweight pressure vessel (4) which is a leak proof container of sufficient strength to withstand stresses developed by the pressurized air, adapted for mounting on board any light vehicle e.g. 3 or 4 wheel vehicle/automobile. Several codes or standards provide guidelines for the safety of such unfired pressure vessel. Commercial tanks are available in the pressure range 7-700 bar (100 to 10000 PSI). High pressure tanks used on board a vehicle to store compressed natural gas (CNG) or hydrogen are known to be made of either a full metal or a metal or polymer core (also called liner) vessel which is wrapped with combined metal and composite fibre for desired strength.

In accordance with a preferred aspect of the invention high strength steel wires of strength 2000 to 6000 MPa with ductility exceeding 40% reduction in area (% RA) in tensile fracture are used to reinforce the pressure vessel. Such wire may be used to provide reinforcement to a metal liner cylindrical tank by the application of a circumferential wrap over the cylindrical portion only.

Air motor is selected from any of the standard make, either of Vane or Piston types. It is important that the air motor has high efficiency. This means that the energy utilization from the compressed air should be high. As for example, for the prototype system of the present invention a vane type air motor made by Gast Co. of USA is used having a rating of 1.7 Horse Power (HP) at 90 PSI. The IC engine had a rating of 5.5 HP. air motor can be connected to the main power train through a clutch (11). This clutch could be a pneumatic or electric clutch. For the prototype, clutch (11) was a one way clutch needle bearing. The clutch bearing allows the power to transfer from Pneumatic Motor to the main power train only as shown by arrows (21,22) in accompanying FIG. 1. For the said prototype system, a directional clutch bearing is mounted on the drive shaft of the air motor. A V-belt pulley is subsequently mounted on the clutch bearing to connect to the IC engine by a V-belt. When the RPM of the air motor exceeded to that of the IC engine, it engaged to the IC engine shaft. The directional clutch (11) bearing thus simplifies the connectivity of the air motor to the main power system. The power goes through a gear box (5) to the wheels of the vehicle (6).

The air motor used in the embodiment is of sufficient horse power to roll the vehicle independently and assist startup of the IC engine. It is usual that the air motor exceed 1 (HP) and preferably be over 5% of the rated HP of the IC engine. The pneumatic power management system will help reduce the inefficient operating periods of the IC engines for example during the idle period assisting with the air motor by operative coupling by clutch operation.

Figure 2:
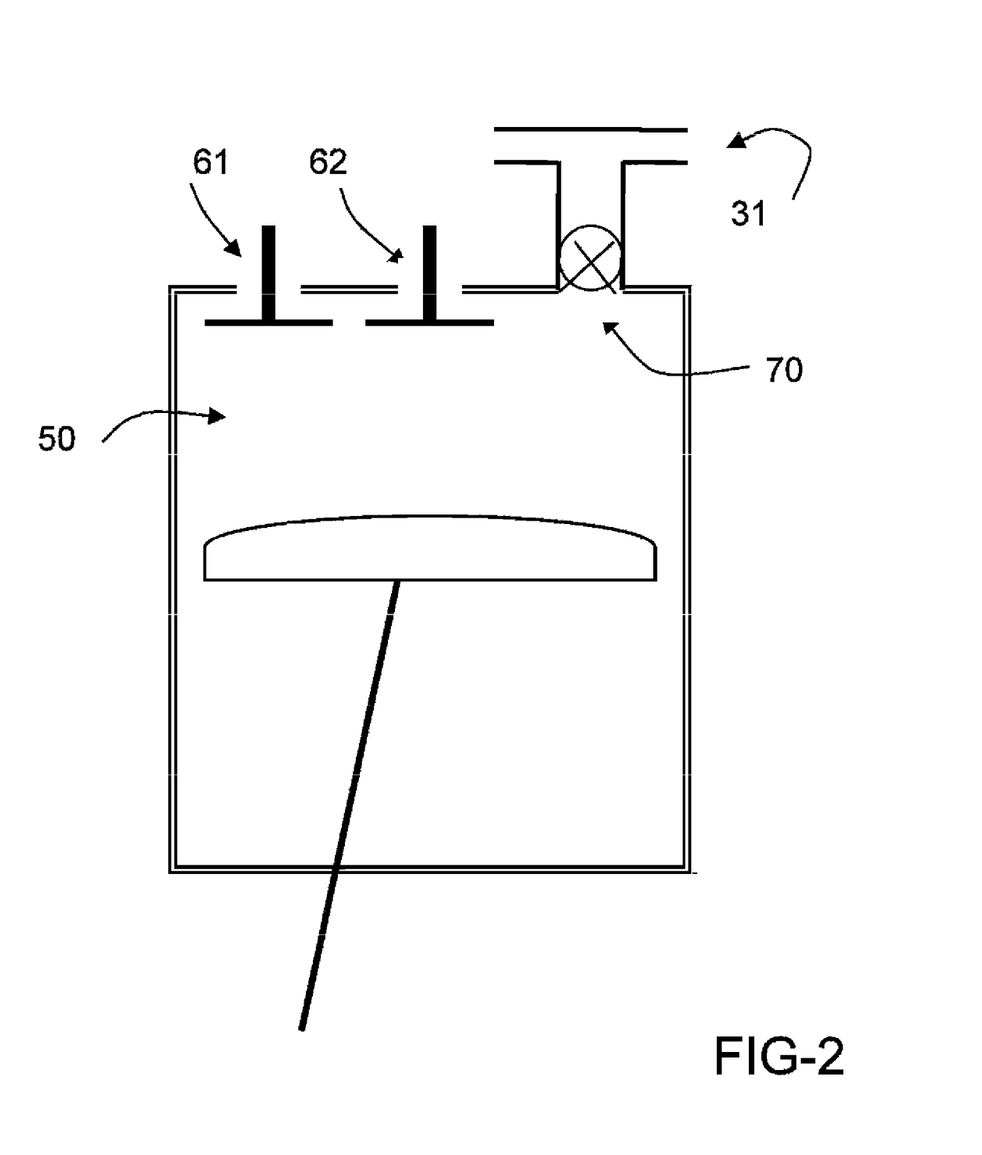
FIG. 2: is the schematic illustration in section of the of the engine cylinder head with piston showing the preferred disposition of the inlet and outlet valves for suction and exhaust for the IC engine along with the provision for desired diversion of compression to vessel when the engine runs idle with fuel cut off or to reduce compression load on idle run of vehicle.

Reference is now invited to the accompanying FIG. 2 that illustrates the schematic illustration of the engine cylinder head with inlet and outlet valves arrangement for the engine suction/exhaust strokes along with provision for the entry/cut-off of compressed air through a one way/bypass valve. Usually air motors are not efficient below 50% of the motor's rated supply pressure. Above this pressure, air motors are faster in response compared to IC engines. On availability of sufficient pressure, the air motor can be activated to assist the power demand of the vehicle prior to the full ramp up of the IC engine. It is therefore proposed that if the pressure vessel has a pressure of more than 50% of the rated operating pressure of the air motor and if there is no demand of power from the vehicle or accessories, the IC engine may completely be stopped by cutting the fuel supply to it. When the demand for power develops, the air motor precedes in delivering power to the vehicle while cranking the IC engine to start and ramp it up to the operating power level. At this stage the air motor may shut off to conserve compressed air. Stopping the IC engine during no demand period will save fuel.

While shutting the IC engine off during no load period is a better fuel saving option, for certain performance reason, reducing the idle rpm or running the engine without developing compression are also helpful in saving fuel. Lower idle rpm usually provides a slower pick up of power by the vehicle. The presence of an air motor can solve this problem. It is therefore also proposed that during the no power demand period, in place of completely shutting the IC engine off, its' idle be reduced significantly, e.g. in the 075% of the normal idle speed range. The air motor when activated will provide sufficient torque to roll the vehicle, allowing IC engine to pick up at a slower pace. Alternatively the compression of the IC engine may be released by the manipulation of its valves and the IC engine may be allowed to rotate during no power demand period while keeping the fuel supply off. Rotation of IC engine without developing compression will take very less energy. The compression can also be released by opening the bypass valve, see following section, to vent the cylinder block to the atmosphere.

It is clearly apparent from the accompanying FIG. 2 that illustrates functioning of the IC engine cylinders (50) usually develop a 1:8 compression. Conventional 4 stroke engines have inlet and outlet valves (61,62) for standard operation. This can develop a pressure of 7 bar (100 PSI) or higher. The IC engine cylinder block can therefore be used as a compressor after cutting the fuel supply to it. A one way bypass valve (70) is installed in the cylinder block of the IC engine to divert the compressed air (31) to the pressure vessel during the compression cycle of a 4 stroke engine. If the engine has a fuel injector, this bypass valve may open following cut off of the power/fuel to the injector. This process may assist braking or deceleration by conserving the energy. The compressed air so generated can further be compressed to higher pressure for storage.

The present invention utilizes energy from compressed air to supplement the power requirement of a vehicle thereby improving the overall fuel economy of a vehicle. IC engines of current automobiles have better fuel efficiency within a certain range of RPM, for example 2000 to 3500 RPM. The objective of the present invention is to provide additional power from a compressed air source through a pneumatic motor to assist the vehicles during periods when the IC engine has to run outside the efficient zone of operation.

As discussed hereinbefore, the system of the invention involves a controller to monitor the state of energy demand by the vehicle and activate the compressor, pneumatic motor and/or the IC engine, the bypass valve and other features accordingly. During no demand period such as during idle, the IC engine can completely be turned off. Subsequently to start the IC engine and/or to start a motion in the vehicle, the pneumatic motor will be activated first to provide sufficient power for these tasks. As stated earlier, the air motor will be energized by the controller only when the pressure in the tank is 50% or higher of the rated operating pressure of the air motor. The air motor will provide the cranking force to the IC engine to start it and/or will provide power to the wheel to start a roll.

The controller is adapted to monitor the pressure in the tank and when it is below the full pressure and subject to availability of power from the IC engine, it will engage the compressor to the IC engine. If the IC engine is performing at above its optimum power/rpm range, the controller will not activate the compressor. If the pressure in the tank is low, the controller may keep the engine running during vehicle's no-load period and engage the compressor to fill the tank. The controller utilize signals from various sensors to execute such logical and selective operations to achieve fuel economy and energy efficiency.

A proto-type 3 wheel vehicle was developed following the above disclosed pneumatic-IVC engine based power management system of the invention of the invention. The engine size, dimension, weight and passenger capacities were very comparable to a popular 3 wheel auto, following Table 1 shows the improvements realized involving the pneumatic IC engine based power management system in the vehicle. Specifically, the fuel consumption with 4 adult riders was found to be better than 32 Kilometers per liter for hybrid engine as compared to 24 km/litres from a commercial vehicle having conventional regular grade petrol (gasoline) engine.

TABLE-1 Performance comparison results of the vehicle incorporating the hybrid power management system of the invention vis-à-vis a commercial vehicle which is not having the power management system:

TABLE 1

| Vehicle | No. of Wheels | Vehicle Weight Kit | Passenger | IC Engine Displacement CC | Km/ Liter |
|---|---|---|---|---|---|
| Having IC + Pneumatic Hybrid Power Management System of the Invention | 3 | 300 | 4 | 163 + Air Motor | 32 |
| Conventional Without any Power Management System | 3 | 300 | 4 | 173 | 24 |

According to another optional aspect of the system of the present invention, the stored compressed air can provide power to accessories of the vehicle. Air conditioner, air blower and other functions may be powered by stored compressed air on board a vehicle. The fuel injectors of the IC engine can also be assisted by the compressed air and may not need a separate compressor.

Figure 3:
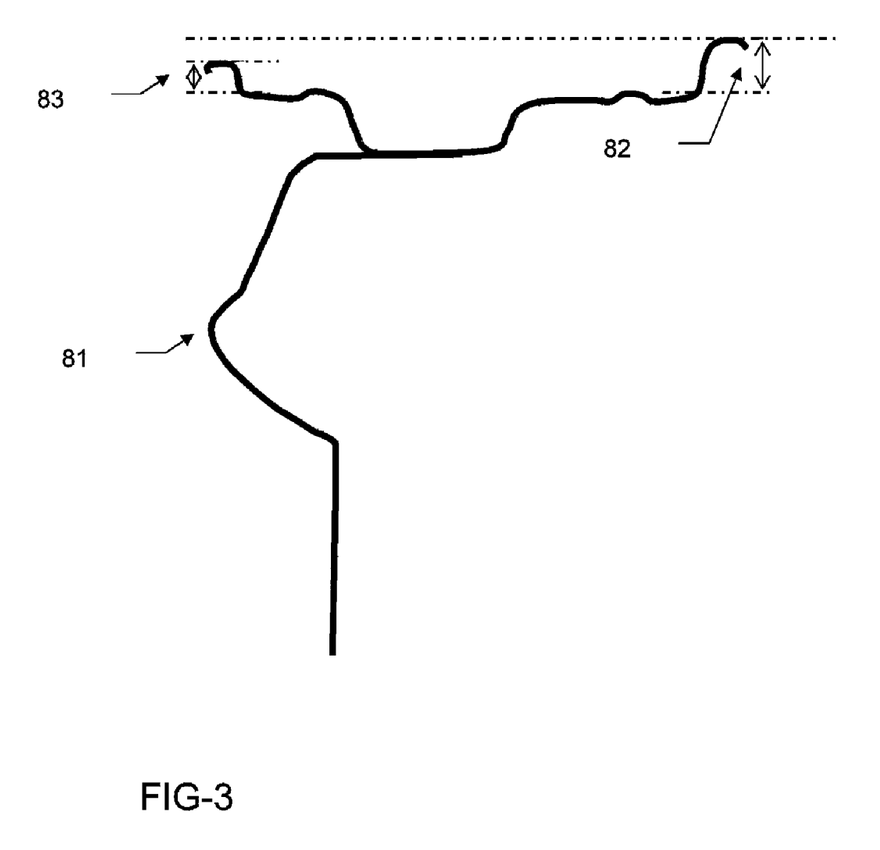
FIG. 3: is the schematic illustration of the rim-tyre and air inflation maintenance system of the invention, optionally supported by the pneumatic power of the hybrid drive system for automobiles.

An active inflation system to the tyres for proper maintenance of air pressure also is adapted to use the stored compressed air from the tank as schematically illustrated in the accompanying FIG. 3. To facilitate easy change over of tyres and where the changed tyre could be inflated from the air from the on-board pressure vessel, it is recommended that the wheel rim flange height be not more than 14 mm as against the current height of more than 15 mm. At least one flange should be between 6 mm to 14 mm, preferably 12 mm, This will facilitate easy mounting and dismounting of tires from the wheel rim. It should be noted that light use vehicles such as bicycles and motor bicycles use a lower, less than 14 mm, rim flange height while standard 3 or more wheel automobiles use larger, over 15 mm flange height. Higher flange height helps prevent tire slip of especially under inflated tires over rim during heavy braking. In the proposed concept, the tire inflation pressure is maintained from the on-board vessel therefore the rim flange height can safely be reduced.

It is thus possible by way of the present invention to provide a hybrid power management system involving pneumatic assisted IC engine for efficient operation of the light automobiles/vehicles with improved fuel economy and reduced pollution level. The hybrid drive system for light vehicles having pneumatically assisted IC engine power drive according to the present invention is thus capable of delivering high power output while achieving fuel economy, operating efficiency, low weight/power ratio required for such on board application and reducing pollution level in exhaust and thus having prospect of wide industrial application for automobile industry and other IC engine operated drive systems with significant economic advantage and saving on scarce fossil fuel.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

I claim:

1. A pneumatic-Internal Combustion (IC) engine based power management system for automobiles and other light vehicles comprising:
   an internal combustion engine operatively connected to an air motor;
   a pneumatic power center supported by a pneumatic compressor adapted to be powered by said internal combustion engine or kinetic energy of the automobile and adapted to store air in a pressure vessel;
   controller means adapted to monitor the power demands for the operation of the automobile, the IC engines RPM and torque and air motors RPM and torque and send signals to the IC engine and its fuel injector systems and to the air motor control valves to respond based thereon; and
   wherein if the pressure vessel has above 50% or more of the rated pressure of the air motor, during no power demand periods, the IC engine is adapted to be completely shut off, or idle at a very low 0-70% of the normal idle RPM.

2. A pneumatic-IC engine based power management system for automobiles and other light vehicles as claimed in claim 1 wherein the controller is adapted such that when the power demand for the operation of the vehicle is low, the controller activates the compressor powered by the IC engine to fill the tank with compressed air/gas and when the demand of power for the operation of the vehicle is high, the controller cuts-off the compressor and other accessories; gear means adapted to transfer power to the wheels of the vehicle.

3. A pneumatic-IC engine based power management system for automobiles and other light vehicles as claimed in claim 1 wherein said air motor exceeds 1 HP and preferably be over 20% of the rated HP of the IC engine.

4. A pneumatic-IC engine based power management system for automobiles and other light vehicles as claimed in claim 3 wherein the compressor is adapted to be activated during braking or deceleration without bringing IC engine in the circuit.

5. A pneumatic-Internal Combustion (IC) engine based power management system for automobiles and other light vehicles comprising:
   an internal combustion engine operatively connected to an air motor;
   a pneumatic power center supported by a pneumatic compressor adapted to be powered by said internal combustion engine or kinetic energy of the automobile and adapted to store air in a pressure vessel;
   controller means adapted to monitor the power demands for the operation of the automobile, the IC engines RPM and torque and air motors RPM and torque and send signals to the IC engine and its fuel injector systems and to the air motor control valves to respond based thereon; and
   wherein the IC engine is adapted to act as a compressor itself, preferably wherein the cylinder block of the IC engine, in addition to standard inlet and exhaust valves, is provided with an additional opening for a one way valve whereby following shut off of the fuel supply, the valve may open to divert compressed air during the compression cycle to the pressure vessel.

6. A pneumatic-IC engine based power management system for automobiles and other light vehicles as claimed in claim 1 wherein the compressor is adapted to be activated during braking or deceleration without bringing IC engine in the circuit.

7. A pneumatic-IC engine based power management system for automobiles and other light vehicles as claimed in claim 5 wherein the compressor is adapted to be activated during braking or deceleration without bringing IC engine in the circuit.

8. A pneumatic-IC engine based power management system for automobiles and other light vehicles as claimed in claim 7 wherein when the vehicle is operating under pneumatic power only, the IC engine is mechanically disengaged from the power train or alternatively its compression is reduced or vented out following cut off of the fuel supply to reduce the compression load on the air motor, said one way valve being adapted to release the compression to the atmosphere.

9. A pneumatic-IC engine based power management system for automobiles and other light vehicles as claimed in claim 1 wherein the IC engine is adapted to act as a compressor itself, preferably wherein the cylinder block of the IC engine, in addition to standard inlet and exhaust valves, is provided with an additional opening for a one way valve whereby following shut off of the fuel supply, the valve may open to divert compressed air during the compression cycle to the pressure vessel.

10. A pneumatic-IC engine based power management system for automobiles and other light vehicles as claimed in claim 9 comprising multi cylinder IC engines wherein only limited number of cylinders of the IC engine are adapted to be switched to a pneumatic compressor mode while other cylinders provide compression energy by running on the fuel.

11. A pneumatic-IC engine based power management system for automobiles and other light vehicles as claimed in claim 1 comprising a controller clutch means comprising a directional clutch bearing is provided to engage the air motor to the IC engine or to the main power train whereby it favours the engagement of the air motor to IC Engine or to drive gear box only when the RPM of the air motor exceeds to that of the driven shaft thus providing a simple connection to deliver power.

12. A pneumatic-IC engine based power management system for automobiles and other light vehicles as claimed in claim 1 wherein the compressed air from the pressure tank is operatively connected to an active inflation system for the tires for proper maintenance of air pressure.

13. A pneumatic-IC engine based power management system for automobiles and other light vehicles as claimed in claim 12 wherein to facilitate easy change over of tires and where the changed tire could be inflated from the air from the on-board pressure vessel, the wheel rim flange height is selectively not more than 14 mm with at least one flange between 6 mm to 14 mm, preferably 12 mm to thereby facilitate easy mounting and dismounting of tires from the wheel rim.

14. A pneumatic-IC engine based power management system for automobiles and other light vehicles as claimed in claim 13 comprising a light weight tank for the use of pneumatic power on board a vehicle preferably having a metal or polymer core which is wound by high strength fibers or metal wires or a combination thereof wherein the metal wires comprise steel wires in the strength range 2000 to 6000 MPa having a reduction in area (RA) ductility of over 30%.

15. A pneumatic-IC engine based power management system for automobiles and other light vehicles as claimed in claim 5 wherein said air motor exceeds 1 HP and preferably be over 20% of the rated HP of the IC engine.

16. A pneumatic-IC engine based power management system for automobiles and other light vehicles as claimed in claim 5 wherein if the pressure vessel has above 50% or more of the rated pressure of the air motor, during no power demand periods, the IC engine is adapted to be completely shut off, or idle at a very low 0-70% of the normal idle RPM.

17. A pneumatic-IC engine based power management system for automobiles and other light vehicles as claimed in claim 5 comprising multi cylinder IC engines wherein only limited number of cylinders of the IC engine are adapted to be switched to a pneumatic compressor mode while other cylinders provide compression energy by running on the fuel.

18. A pneumatic-IC engine based power management system for automobiles and other light vehicles as claimed in claim 5 wherein the compressed air from the pressure tank is operatively connected to an active inflation system for the tires for proper maintenance of air pressure.

19. A pneumatic-Internal Combustion (IC) engine based power management system for automobiles and other light vehicles comprising:
    an internal combustion engine operatively connected to an air motor;
    a pneumatic power center supported by a pneumatic compressor adapted to be powered by said internal combustion engine or kinetic energy of the automobile and adapted to store air in a pressure vessel;
    controller means adapted to monitor the power demands for the operation of the automobile, the IC engines RPM and torque and air motors RPM and torque and send signals to the IC engine and its fuel injector systems and to the air motor control valves to respond based thereon; and
    wherein on demand of power when the IC engine is off or running below the required power level, the air motor will first be activated to start the IC engine or to provide power to the vehicle or to do both to thereby reduce fuel consumption during initial run/acceleration period by making advantageous use of higher torque of pneumatic motor at lower RPM.

20. A pneumatic-IC engine based power management system for automobiles and other light vehicles as claimed in claim 19 wherein the IC engine is adapted to act as a compressor itself, preferably wherein the cylinder block of the IC engine, in addition to standard inlet and exhaust valves, is provided with an additional opening for a one way valve whereby following shut off of the fuel supply, the valve may open to divert compressed air during the compression cycle to the pressure vessel.

* * * * *